3,082,108
DELAYED TACK COATINGS
Julius Sirota, South Plainfield, N.J., assignor to National Starch and Chemical Corporation, New York, N.Y., a corporation of Delaware
No Drawing. Filed Sept. 6, 1960, Ser. No. 53,895
7 Claims. (Cl. 106—186)

This invention relates to novel adhesive compositions for use in the preparation of delayed tack coatings and to the coatings derived therefrom.

It is the object of this invention to provide improved delayed tack coatings characterized by the ease and simplicity of both their preparation and subsequent usage. More particularly, it is the object of this invention to provide adhesives for delayed tack coatings which are free from many of the disadvantages which are found in presently employed materials including the need for special treatment both before and after their application to a substrate, their limited stability which necessitates preparation immediately prior to use, and their general lack of adaptability which prevents their use in a wide variety of applications wherein delay tack coatings would be of interest.

As is known in the art, delayed tack coatings are thermoplastic adhesive coatings which after being heated to a temperature where they become adhesive and tacky, thereafter retain their tacky, adhesive quality for an interval after heating is discontinued. Such coatings find extensive application in a variety of products including labels and tapes and in the manufacture of paperboard cartons and boxes whose flaps are often adhered by the use of these coatings.

The existing commercial processes for preparing delayed tack coatings usually involve the deposition of an adhesive, in the form of either an aqueous dispersion or a hot melt, to the substrate surface. The aqueous dispersion adhesives ordinarily contain an intimate mixture of a thermoplastic resin or polymer along with a solid, crystalline plasticizer. When a coating derived from such a dispersion is heated, the crystalline plasticizer melts and solvates the thermoplastic polymer to a tacky, pressure-sensitive form which remains tacky until the plasticizer recrystallizes. The limiting features of these aqueous dispersion adhesives include the necessity for milling the crystalline plasticizers so that they may be put into a form suitable for the final dispersion. These aqueous dispersions also display a rather limited degree of stability which necessitates their preparation immediately prior to their use. In addition, these adhesive systems require a lengthy, low temperature drying period following their deposition on a substrate so as to prevent any unwanted activation of the coating which would result in what is referred to as "blocking" meaning a sticking of the coating to itself or to other nearby surfaces. Finally, there is often a need for a surface dusting of these coatings with a powdery material so as to improve their non-blocking characteristics.

As for the so-called hot melt adhesives, these materials are essentially 100% solid adhesives which melt on heating and are thereby applied to substrates in the molten form. Since such freshly deposited coatings are in a hot, tacky state, it is necessary to prevent the occurrence of blocking and this is accomplished by either dusting the surface of the hot coating with a suitable powdery material or by covering the tacky surface with a release paper until such time as the coating has cooled to the point where it is no longer tacky. It is thus seen that the materials and procedures heretofore used for the preparation of delayed tack coatings leave much to be desired.

I have now discovered an excellent adhesive system for use in the preparation of delayed tack coatings. The novel compositions of my invention provide for delayed tack coatings which are, in fact, free from all of the above described disadvantages inherent in existing procedures and materials.

In brief, the adhesives of my invention comprise mixtures of one or more thermoplastic materials along with a novel latent plasticizer derived from the reaction of carbon dioxide with an amine which is capable of functioning as a plasticizer or solvent for the thermoplastic materials. These latent plasticizers, which will hereinafter be referred to as amine-carbonates, are solid materials capable of being decomposed, upon the application of heat, thereby yielding carbon dioxide along with the free amine in its original liquid state. It is this latter property which accounts for the improved properties and simplified action of my adhesives when the latter are used for the preparation of delayed tack coatings. Thus, when these amine-carbonates are present in an adhesive formulation in combination with one or more thermoplastic materials, they yield coatings from either an aqueous or lacquer system which may be easily applied to a wide variety of substrates. Upon drying, these coatings display a surface which is entirely free from any tackiness or blocking without the necessity for a surface dusting operation. However, when heat is applied, the solid amine-carbonate latent plasticizer decomposes, liberating the free, liquid amine which then proceeds to solvate or plasticize the thermoplastic material thereby converting the coatings into the desired adhesive, tacky state. Also of some significance is the fact that the adhesive formulations containing these novel latent plasticizers are extremely stable and may be prepared and stored for extended periods prior to their actual use.

It should be pointed out, at this time, that the above described amine-carbonate latent plasticizers are rather unique in that they now make it possible for the practitioner to employ liquid plasticizers in adhesive applications which were heretofore limited to the use of solid, crystalline plasticizer materials.

In preparing these amine-carbonate latent plasticizers one may employ any amine which when reacted with $CO_2$ will produce a solid amine carbonate which upon subsequent heating will release the amine to act as a plasticizer and thereby solvate the particular polymers with which the resulting amine-carbonate is to be formulated. The practitioner may thus employ with this in view alkyl amines, such as dodecyl amine, butylamine, and octylamine; aromatic amines, such as benzylamine, methylbenzyl amine, diphenylamine, and o-methoxyphenethylamine; hydroxylated amines, such as 2-amino-1,2 diphenyl ethanol and 2-amino-2-ethyl-1,3 propanediol; and, high molecular weight, polynuclear amines such as dehydroabietylamine. I have found the latter amine to be especially suitable for the process of my invention.

The procedure for conducting the reaction between the amine and carbon dioxide will vary depending upon the nature of the amine. Optimum conditions call for the bubbling of gaseous carbon dioxide through a solution of the amine in a solvent, including in some cases water, in which the amine-carbonate reaction product is insoluble. It is also possible to add carbon dioxide directly to many amines. With either method the reaction is continued until precipitation is complete. "Seeding" the solution with a small portion of previously prepared reaction product will result in an acceleration of this precipitation. As alternative procedures, one may employ solid carbon dioxide ("Dry Ice") as well as powdered ammonium carbonate as sources of carbon dioxide. Another method which can be used involves exposure of the amine to the carbon dioxide content of the atmosphere. In any case, the resulting amine-carbonate precipate may then be filtered, washed with additional solvent, allowed to air dry, and ground to the desired mesh size.

The thermoplastic materials with which the amine-carbonates may be formulated may be chosen by the practitioner to suit any specific conditions or circumstances under which the resulting adhesive is to be employed. In speaking herein of thermoplastic materials, I refer to that class of resins and polymers which may be softened by heat and which then regain their original properties on cooling. Examples of such materials include polystyrene, polyvinyl acetate, polyvinyl chloride, polyvinyl acetate-chloride copolymers, polyvinylidene chloride, polyacrylonitrile, polymethyl methacrylate, non-drying alkyds, non-drying phenolics, thermoplastic cellulose esters and ethers, coumarone-indene resins, ester gums, natural rubber and various synthetic rubbers such as the chloroprene, butadiene-styrene, nitrile, and butyl types. By selecting various combinations of these thermoplastic materials, it is possible for the practitioner to prepare a final composition having any desired combination of such properties as degree of adhesion, ultimate strength, degree of tack, and length of delayed tack period. Although there might be some question, from the purely technical viewpoint, whether thermoplastic cellulose esters and ethers are resins, the term "thermoplastic resins" as used in the specification and claims is meant to include all thermoplastic polymers.

As has been noted the adhesives of my invention may be formulated in either a lacquer or a solvent free, aqueous dispersion system. However, lacquers appear to be more versatile in that they provide more rapid drying times for the freshly deposited coatings. The organic solvents which can be used in preparing these lacquers should be fast drying and exhibit infinite solvency for the thermoplastic materials and minimum or no solvency for the amine-carbonate reaction products. Thus, among the solvents which may be used are hexane, toluene, naptha, methylene chloride and ethanol with the exact choice depending, of course, upon the solubility characteristics of both the thermoplastic materials and the amine-carbonate which are being utilized. The use of solvents which may dissolve the amine-carbonate plasticizer should be avoided as such solvents will accelerate the decomposition of these reaction products. It should be noted that these lacquers may readily be converted to aqueous form by adding water along with a suitable emulsifier.

With respect to proportions, the praciticner will find that the amount of amine-carbonate plasticizer which can be used may be varied so as to achieve any desired properyt in the resulting adhesive. In general, however, one may use from about 50–500%, by weight, of amine-carbonate as based on the total weight of thermoplastic material present in the formulation. The total solids content of my formulations may vary considerably depending upon the particular conditions under which the adhesive is to be used; however, formulations containing in the range of from 35–75%, by weight, of total solids (i.e. amine-carbonate, thermoplastic materials, plus any additional additives) will suffice for most applications.

One may introduce any type of additive whose presence may be desired into the adhesive formulations of my invention. These additives may include such materials as inert mineral fillers, waxes, emulsifiers, and surfactants, etc. The actual preparation of my adhesives does not necessitate any special procedures or equipment and involves merely the dispersal of the amine-carbonate within the lacquer or aqueous dispersion of the thermoplastic material. The resulting mixture is then agitated or stirred until uniform in consistency.

Coatings may be prepared from my adhesives by means of any of the conventional coating techniques including roller coating, knife coating, sheet coating, printing, stencilling, screening, brush coating, spray coating or hand coating. All types of substrate materials may be utilized including paper, paperboard, foil, cardboard, corrugated board and various polymeric films, etc. In all cases it will be found that the resulting coated stock will be completely non-tacky and non-blocking throughout the complete temperature range which is likely to be encountered under conditions of normal storage and shipment.

In activating these coatings to a tacky state, temperatures in the range of approximately 200°–400° F. should be applied for periods of from 2 to 90 seconds. Within this range the amine-carbonates will readily decompose thereby permitting the free, liquid amine to solvate the thermoplastic materials into the desired adhesive, tacky state. Higher temperatures may also be applied for shorter periods, however, the danger of burning or degradation may be accentuated.

The following examples will more clearly illustrate the embodiment of my invention. In these examples all parts given are by weight unless otherwise noted.

EXAMPLE I

This example illustrates the preparation of amine-carbonate latent plasticizers for use in the adhesive compositions of my invention.

A. One part of dehydroabietylamine was dissolved in 3 parts of hexane whereupon carbon dioxide was bubbled into the solution over a 3 hour period. After being allowed to stand for 16 hours a white gel-like precipitate was observed. This precipitate was filtered through cheese cloth, washed twice with small portions of hexane, air dried and then ground to a powdery consistency.

B. Thirty-five parts of dehydroabietylamine and 10 parts of powdered ammonium carbonate were admixed with 65 parts of water. This mixture was agitated for 2 days resulting in the ultimate formation of a coarse amine-carbonate precipitate. This precipitate was filtered through cheese cloth, washed twice with small portions of water, air dried, and then ground to a powdery consistency.

C. Two parts of alpha-methyl benzylamine was dissolved in 6 parts of hexane. One part of solid carbon dioxide ("Dry Ice") was introduced into the solution resulting in the evolution of gaseous carbon dioxide. The precipitation of the amine-carbonate reaction product began immediately and was complete after 2 hours. The precipitate was then filtered through cheese cloth, washed twice with small portions of hexane and then ground to a powdery consistency.

D. Gaseous carbon dioxide was bubbled through a batch of octylamine for a period of 5 hours whereupon precipitation of the amine-carbonate reaction product was essentially complete. The resulting precipitate was filtered through cheese cloth, washed twice with small portions of hexane, air dried and then ground to a powdery consistency.

E. One part of 2-amino-2-ethyl-1,3-propandiol was dissolved in 2 parts of water. Gaseous carbon dioxide was bubbled through this solution for a period of 3 hours whereupon precipitation of the amine-carbonate reaction product was essentially complete. The resulting precipitate was filtered through cheese cloth, washed twice with small portions of water, air dried and then ground to a powdery consistency.

F. One part of o-methoxyphenethylamine was dissolved in one part of anhydrous ethyl ether. Gaseous carbon dioxide was bubbled through this solution for a period of 4 hours whereupon precipitation of the amine-carbonate reaction product was essentially complete. The resulting precipitate was filtered through cheese cloth, washed twice with small portions of ethyl ether, air dried and then ground to a powdery consistency.

EXAMPLE II

This example illustrates the preparation of adhesive compositions containing the novel amine-carbonate latent plasticizers whose preparation was described in Example I as well as several others which were similarly prepared.

The following formulations were prepared by a procedure involving merely the combination of the listed ingredients followed by a thorough agitation of the resulting mixtures.

Formulation #1

|   | Parts |
|---|---|
| Polystyrene | 25 |
| Dehydroabiethylamine-$CO_2$ product | 15 |
| Calcium carbonate (filler) | 100 |
| 20% solution of natural rubber in hexane | 15 |
| Hexane | 75 |

Formulation #2

|   | |
|---|---|
| Polystyrene | 25 |
| Dehydroabiethylamine-$CO_2$ product | 50 |
| Calcium carbonate | 100 |
| 20% solution of natural rubber in hexane | 15 |
| Hexane | 75 |

Formulation #3

|   | |
|---|---|
| Polystyrene | 25 |
| Dehydroabiethylamine-$CO_2$ product | 150 |
| Calcium carbonate | 100 |
| 20% solution of natural rubber in hexane | 15 |
| Hexane | 75 |

Formulation #4

|   | |
|---|---|
| 20% solution of natural rubber in hexane | 10 |
| Hexane | 10 |
| Octylamine-$CO_2$ product | 20 |

Formulation #5

|   | |
|---|---|
| Polystyrene | 2 |
| Alpha-methyl benzylamine-$CO_2$ product | 10 |
| Heptane | 10 |

Formulation #6

|   | |
|---|---|
| Polyvinyl acetate | 2 |
| 2-amino-2-ethyl-1,3 propanediol-$CO_2$ product | 10 |
| Toluene | 10 |

Formulation #7

|   | |
|---|---|
| Butyl rubber | 2 |
| o-Methoxyphenethylamine-$CO_2$ product | 10 |
| Octane | 15 |

Formulation #8

|   | |
|---|---|
| Polyvinyl chloride | 1 |
| Butadiene-styrene rubber | 1 |
| Diphenylamine-$CO_2$ product | 10 |
| Ethyl ether | 20 |

Formulation #9

|   | |
|---|---|
| Cellulose acetate | 2 |
| Butylamine-$CO_2$ product | 8 |
| Ethyl alcohol | 10 |

Formulation #10

|   | |
|---|---|
| Polyvinylidene chloride | 2 |
| Benzylamine-$CO_2$ product | 12 |
| Methyl ethyl ketone | 8 |

EXAMPLE III

This example illustrates the use of the adhesive of my invention in the preparation of delayed tack coatings.

A batch of the adhesive of Formulation #1, of Example II was coated on paper by means of a doctor blade. This composition was applied at a coating weight of 10 lbs., by weight of solids, per ream of paper. The resulting coating was air dried for one minute at a temperature of 86° F. It was noted that the dried, coated sheets were completely non-tacky and non-blocking. In activating these sheets they were exposed to a temperature of 350° F. for a period of one minute. The adhesive coatings were tackified as a result of the solvating action of the free amine (i.e. dehydroabietylamine) which was released upon decomposition of the amine-carbonate reaction product. These coatings remained in an adhesive, tacky state for a period of 3 minutes during which time various samples were easily adhered to a wide variety of surfaces including paper, aluminum foil, cardboard and polyethylene film.

In repetitions of the above described procedure each of the adhesive formulations listed in Example II were similarly applied to various substrates such as corrugated board, cardboard, label stock and cloth tape. The resulting coatings were all comparable as regards their complete absence of tack and blocking. Each of these coatings was also activated and applied to various surfaces.

EXAMPLE IV

This example illustrates the conversion of one of my adhesive lacquers to aqueous emulsion form.

One hundred parts of the hexane lacquer of Formulation #2 of Example II were converted to aqueous emulsion form by the addition thereto, with agitation, of 3 parts of isooctyl phenyl polyethoxy ethanol (a non-ionic emulsifier) and 50 parts of water. The resulting emulsion was employed in the preparation of delayed tack coatings which were comparable in their properties to the coatings whose preparation was described in Example III.

Summarizing, this invention provides the practitioner with adhesive systems containing novel amine-carbonate latent plasticizers. These adhesives are especially suitable for use in the preparation of improved delayed tack coatings. Variations may be made in proportions, procedures and materials without departing from the scope of this invention which is limited only by the following claims.

I claim:

1. An adhesive composition especially suited for use in the preparation of delayed tack coatings consisting essentially of a thermoplastic resin and a solid reaction product of carbon dioxide and an amine which is a plasticizer for said thermoplastic resin, held in a liquid medium, said amine-carbon dioxide reaction product being a latent plasticizer for said resin in being non-plasticizing under normal temperatures but being convertible by heat to a liquid amine for plasticizing the resin.

2. The adhesive composition of claim 1, in which the latent plasticizer consists essentially of the product of carbon dioxide with a liquid amine selected from the class consisting of alkyl amines, aromatic amines, and hydroxylated amines.

3. The adhesive composition of claim 1, in which the latent plasticizer consists essentially of the product of carbon dioxide with dehydroabietylamine.

4. A substrate coated with an adhesive composition consisting essentially of a thermoplastic resin and a solid reaction product of carbon dioxide and an amine which is a plasticizer for said thermoplastic resin, said amine carbon dioxide reaction product being a latent plasticizer for said resin in being non-plasticizing under normal temperatures but being decomposable upon application of heat so as to yield the free, liquid amine which can then solvate said thermoplastic resin.

5. The substrate of claim 4 in which the latent plasticizer consists essentially of the product of carbon dioxide with a liquid amine selected from the class consisting of alkyl amines, aromatic amines and hydroxylated amines.

6. The substrate of claim 4 in which the latent plasticizer consists essentially of the product of carbon dioxide with dehydroabietylamine.

7. The adhesive composition of claim 1 wherein said liquid medium is selected from the group consisting of water, organic solvents in which said thermoplastic resin is soluble but in which said latent plasticizer is insoluble, and mixtures of water with an organic solvent in which said thermoplastic resin is soluble but in which said latent plasticizer is insoluble.

References Cited in the file of this patent

UNITED STATES PATENTS

| | | |
|---|---|---|
| 2,462,029 | Perry | Feb. 15, 1949 |
| 2,528,399 | Strain | Oct. 31, 1950 |
| 2,608,543 | Wiswell | Aug. 26, 1952 |
| 2,771,377 | Greminger et al. | Nov. 20, 1956 |
| 2,835,603 | Swinehart et al. | May 20, 1958 |

FOREIGN PATENTS

| | | |
|---|---|---|
| 603,160 | Great Britain | June 10, 1948 |
| 618,767 | Great Britain | Feb. 28, 1949 |
| 619,275 | Great Britain | Mar. 7, 1949 |
| 622,955 | Great Britain | May 10, 1949 |

OTHER REFERENCES

Jensen et al.: Acta Chem. Scand., volume 6, pages 1086–1089 (C.A., volume 47, 9928i).

Smola: Mitt Chem. Forsch. Inst. Ind., Oesterr., volume 2, pages 38–40, 43–45 (C.A., volume 43, 6157i).